Nov. 5, 1968          H. G. BLANK          3,409,887
                SOLID STATE DRIVING CIRCUIT
Filed Dec. 1, 1965                    3 Sheets-Sheet 1

INVENTOR.
HANS G. BLANK
BY R. J. Frank
ATTORNEY.

Nov. 5, 1968

H. G. BLANK 3,409,887

SOLID STATE DRIVING CIRCUIT

Filed Dec. 1, 1965

INVENTOR.
HANS G. BLANK

BY R. J. Frank
ATTORNEY.

INVENTOR.
HANS G. BLANK
BY R. J. Frank
ATTORNEY.

United States Patent Office 3,409,887
Patented Nov. 5, 1968

3,409,887
SOLID STATE DRIVING CIRCUIT
Hans G. Blank, Bronx, N.Y., assignor to General Telephone and Electronics Laboratories, Inc., a corporation of Delaware
Filed Dec. 1, 1965, Ser. No. 510,839
5 Claims. (Cl. 340—324)

This invention relates to a solid state driving circuit and in particular to a driving circuit which translates a digital signal into a driving signal suitable for energizing a bar graph display device.

Bar graph display devices, wherein the length of an indicator corresponds to the quantity being measured, have potentially wide application in industrial process controls, aircraft instrumentation and, in general, in systems wherein a number of measured quantities are to be displayed in a manner facilitating ready comparison. Each quantity to be displayed is normally measured by a digital or pulse counting device with the result that the driving circuit for the corresponding bar graph must translate a digital input signal into an appropriate energizing signal.

Typically, display devices of this type employ an elongated electroluminescent lamp in which the long dimension is calibrated in terms of the quantity being measured. The lamp comprises a segmented electrode mounted on one surface of the electroluminescent medium and a common electrode mounted on the opposing surface. The application of an energizing voltage, normally of the order of several hundred volts A.C., between selected electrode segments and the common electrode results in the illumination of a bar. The driving circuit, which applies the energizing voltage, should have the capability of responding rapidly to digital input signals and function properly under a wide variety of environmental conditions. In addition, the driving circuit must not only translate the input signal and apply an energizing voltage to the electrode segment corresponding to the magnitude of the quantity being measured, but also apply energizing voltages to all lower electrode segments so that an unbroken bar may be activated.

Since the magnitude of the energizing voltage determines the brightness of an electroluminescent lamp, it is desirable to employ a driving circuit wherein the energizing voltage applied to the electrode segments is substantially constant. However, the length of the bar to be illuminated depends on the magnitude of the quantity being measured and, therefore, the impedance presented to the driving circuit varies substantially. To reduce the effect of the wide variation in impedance, the series impedance of the driving circuit should be minimized such that substantially the entire energizing voltage is applied between the selected electrode segments.

Accordingly, an object of the present invention is the provision of an improved driving circuit for an electroluminescent bar graph.

Another object is to provide a solid state driving circuit wherein the magnitudes of the output signals are substantially constant for loads of varying impedance.

In accordance with the present invention, a driving circuit is provided which comprises a plurality of four-layer semiconductor elements having first, second and third electrodes. The first electrode of each element is connected to a first input terminal. The third electrode of each element is connected to a corresponding series impedance. The series impedances, in turn, are connected to a second input terminal.

An energizing voltage is applied between the first and second input terminals. This energizing voltage appears across each combination of semiconductor element and series impedance with the portion of the voltage appearing across each being determined by their relative impedances. In the absence of a signal applied to the second electrode of a semiconductor element, the element is essentially non-conductive and exhibits a relatively high impedance. Therefore, substantially the entire energizing voltage appears across the element.

When a signal is applied to the second electrode of an element, the element is rendered conductive and exhibits a relatively low impedance. As a result, substantially the entire energizing voltage appears across the corresponding series impedance. An individual driving circuit output terminal is coupled to the junction of the third electrode of each element and its corresponding series impedance.

The signals at the second electrode of each semiconductor element are provided by employing a plurality of pulse transformers. Each pulse transformer is coupled to an output terminal of a generating means. The generating means energizes selected pulse transformers in accordance with a coded digital input signal whereby magnetic flux is created in the selected pulse transformers.

By coupling the second electrode of each semiconductor element to a pulse transformer, the establishing and collapsing of the flux therein result in voltages being generated at the second electrode of that element. The currents established by these voltages render the element conductive. The coupling between a semiconductor element and the corresponding pulse transformer may be effected by connecting the second and third electrodes of the element to opposite ends of the transformer secondary winding.

The second electrode of the element presents a load equivalent to a diode to the corresponding transformer. It has been found that least power is required from the generating means if the polarity of the transformer couplings are selected such that the voltage generated by the collapsing flux, i.e. the trailing edge of the signal, is in the forward direction of the diode. As a result, when the energizing signal for the transformer terminates, substantially all of the energy stored in the transformer is used to render the semiconductive element conductive.

In addition, the semiconductor element in its conductive state serves as a damping element to minimize any reverse swing of the output of the generating means. Also, the second electrode presents a reverse biased diode load to the transformer during the build-up of the flux so that leakage does not retard the build-up.

The generating means which selectively energizes the transformers preferably comprises a pulse generator, having a plurality of output terminals, and gate means coupled to the generator output terminals. The gate means, which is coupled in series with the transformers, controls the energization of the transformers in accordance with a coded digital input signal applied thereto.

In applications wherein the present driving circuit is used to activate an electroluminescent bar graph, the input signal corresponds to the magnitude of the quantity to be displayed. The driving circuit output terminals are connected in a preassigned order to individual electrode segments of the bar graph with a driving signal appearing at a particular output terminal when the corresponding semiconductor element is rendered conductive. In order to activate an unbroken bar, the driving circuit not only provides an output signal at the terminal coupled to the electrode segment corresponding to the numeric magnitude of the input signal, but also provides an output signal at all terminals in the preassigned order coupled to lower electrode segments.

The above operation is provided by employing gate means comprising a plurality of transistor switches connected in series with the generator output terminals and a reference potential. The individual switches are controlled by "and" and "or" logic circuits, to which the digits of the input signal are applied, in a manner which permits not only the numeric driving circuit output terminals to be energized, but also all preceding or lower output terminals. The impedance in series with each driving circuit output terminal and the energizing voltage source is that of a semiconducting element in its conductive state which is relatively low. As a result, the voltages appearing at the driving circuit output terminals in accordance with the coded input signal are substantially independent of the magnitude of the input signal, i.e. the magnitude of the load.

Further, the provision of an additional semiconductor element and corresponding impedance coupled to each transformer permits the simultaneous control of two elements connected to two phases of an energizing voltage. The output signals, in this case, are of equal magnitude with a 180 degree phase difference therebetween. This embodiment is found useful in applications wherein the utilization circuit, or bar graph, requires additional logic operations to be performed with the output signals. For example, selecting a load having an energizing voltage greater than either of the individual output signals but less than the sum requires the concurrent application of both output signals in order to be energized. The subsequent gating of either or both of these output signals may be readily provided to increase the measure of control.

Further features and advantages of the invention will become more readily apparent from the following description of specific embodiments taken in conjunction with the accompanying drawings, in which FIG. 1 is a block schematic diagram of one embodiment of the invention;

Figure 1:
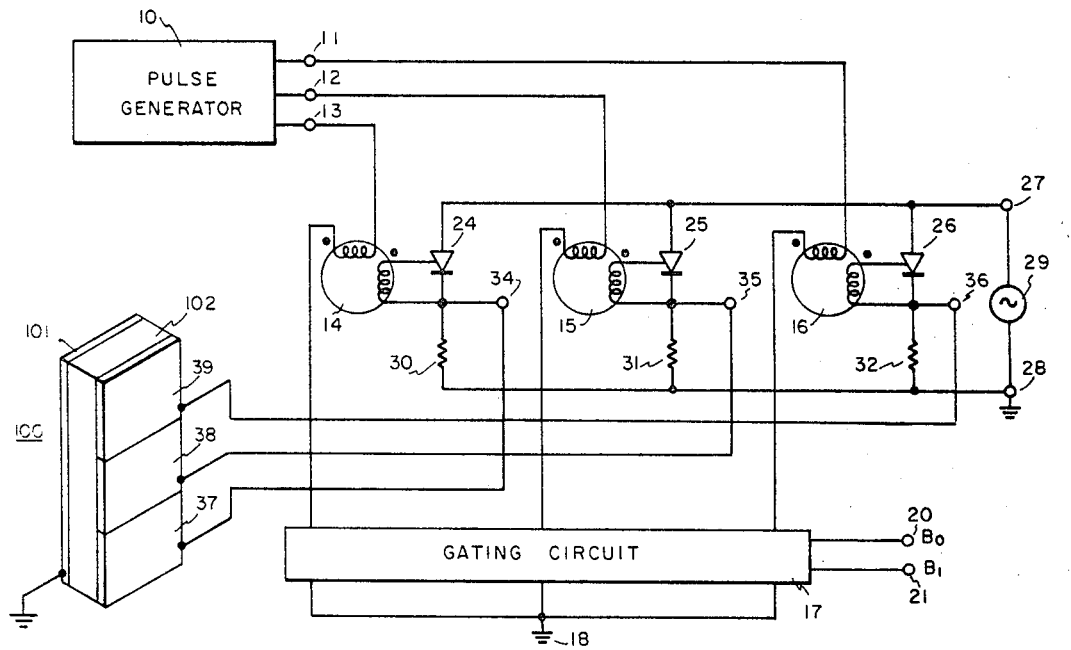

Referring now to FIG. 1, a pulse generator 10 is shown having three output terminals 11, 12, 13. Pulse generator 10, for example a blocking oscillator, is preferably a free-running generator providing pulses having a predetermined frequency at the output terminals.

Each output terminal 11, 12, 13 is connected through a corresponding pulse transformer 14, 15, 16 to gating circuit 17. Gating circuit 17, in turn, couples one or more of the terminals 11, 12, 13 to a reference potential 18, i.e. ground, in accordance with a digital input signal applied to input terminals 20, 21. The embodiment shown is responsive to a two digit binary signal, designated as $B_0$ and $B_1$, which corresponds to a numeric three excluding zero, which is generally omitted in devices of this type. It shall be noted that the number of pulse transformers is equal to the numeric equivalent of the binary input signal. The gating circuit, which may comprise three individual transistor switches, is constructed such that the number of output terminals 11, 12, 13 coupled to reference potential 18 is equal to the numeric equivalent of the applied binary input signal.

Individual three electrode, four layer semiconductor elements 24, 25, 26 such as a silicon controlled rectifier (SCR), are associated with a corresponding one of pulse transformers 14, 15, 16. The second electrode of each SCR is shown coupled to one of the pulse generator output terminals 11, 12, 13 by the corresponding pulse transformer. Hereinafter, the leads connecting the pulse generator 10 to the gating circuit 17 will be referred to as the primary windings with the leads connecting the second and third electrodes of the SCR referred to as the secondary.

The third electrode of each SCR 24, 25, 26 is connected to a corresponding impedance 30, 31, 32 which, in turn, is connected to terminal 28. The first electrode of each SCR is connected to terminal 27. The application of a voltage from source 29 between terminals 27 and 28 results in this voltage appearing across each combination of SCR and impedance. Although the embodiment of FIG. 1 shows the anode of each SCR as being the first electrode, it will be apparent that the SCR's may be reversed such that the cathode constitutes the first electrode if desired.

In addition, an output terminal 34, 35, 36 is connected to the third electrode of each SCR 24, 25, 26. The portion of the energizing voltage appearing at a particular output terminal with respect to the potential at terminal 28 is determined by the relative impedance of the SCR and the corresponding impedance connected to its third electrode. The output terminals 34, 35, 36 are connected, in turn, to electrode segments 37, 38, 39, respectively of electroluminescent bar graph 100.

When a signal of the appropriate polarity is applied to the second electrode of an SCR, the SCR becomes conductive with the result that the first to third electrode impedance decreases and substantially the entire energizing volage appears across the corresponding series impedance. In the absence of this signal, the SCR is nonconductive so that the first to third electrode impedance is quite high and essentially no voltage appears across the corresponding series impedance. The voltage appearing at output terminals 34, 35, 36 is switched, therefore, in accordance with the second electrode signals. The SCR's commercially available are responsive to a positive signal applied to the second electrode and the present discussion is in terms thereof. However, opposite polarity SCR's may also be employed if desired.

In operation, the digits of a binary signal are applied to terminals 20, 21 of gating circuit 17. The gating circuit connects selected output terminals of the pulse generator to ground so as to permit the pulses produced thereby to establish a flux in the corresponding pulse transformer. The establishment of the flux induces a voltage in the secondary winding which is connected to the second electrode of the corresponding SCR. The polarity of the induced voltage is such that the SCR is not rendered conductive. When the pulse terminates, the flux collapses inducing a voltage which renders the SCR conductive. This lowers the impedance of the SCR and results in substantially the entire energizing voltage appearing at the corresponding output terminals 34, 35, 36 and electrode segments 37, 38, 39.

The magnitude, duration and repetition rate of the pulses is selected such that the SCR is not only rendered conductive by a single pulse but is continuously maintained conductive during a period containing many pulses. The magnitude of the pulse required to render the SCR conductive is determined by the impedance presented by the secondary winding and the resistance of the forward biased diode at the second electrode since the SCR is a current operated device. In one embodiment employing type 2N1597 SCR's, the magnitude and duration of the pulses at the primary of the transformers were selected to be 20 volts and 1 microsecond respectively which resulted in a second electrode current of about 40 milliamperes to render the SCR's conductive. In addition, the ratio of the pulse duration to the repetition rate was selected to be about 1 to 10 in order to insure that the SCR was rendered continuously conductive. The SCR's are maintained conductive during the period between pulses due to the relatively large current supplied to the second electrode and the time required for this current to decay. However, it will be recognized that other values may be employed in circuits employing different components.

The SCR's may be independently driven into conduction with any or all being driven on by gating circuit 17. For a two digit input signal, SCR 24 would be rendered conductive by either $B_1$ or $B_0$, SCR 25 by $B_1$ alone, and SCR 26 by the combination of $B_1$ and $B_2$. As a result, the driving circuit translates the digital input signal to a numeric and all lower driving signal for bar graph 100. As shown, the common electrode 101 of bar graph 100 is connected to ground so that the application of the driving signal to one or more electrode segments results in the activation of a portion of electroluminescent layer 102. Since the driving signals are of a numeric and all lower form, an unbroken bar is activated.

Figure 2:
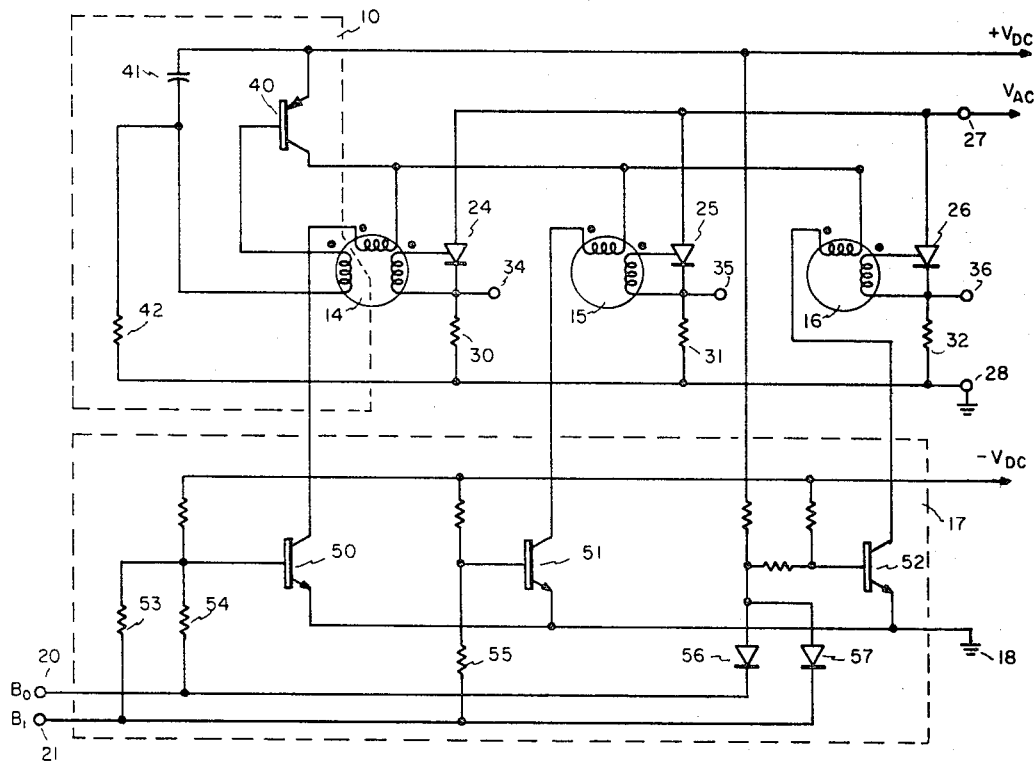
FIG. 2 is an electrical schematic diagram of the embodiment of FIG. 1.

The embodiment of FIG. 1 is shown in further detail in FIG. 2 wherein pulse generator 10 is a blocking oscillator comprised of transistor 40, capacitor 41 coupled between the emitter and base of the transistor via transformer 14, and resistor 42. The operation of the oscillator may be described by considering that initially the capacitor 41 is uncharged so that transistor 40 is nonconductive since it requires a small forward voltage drop across the base-emitter junction to provide conduction. Current through resistor 42 then charges capacitor 41 until the base-emitter junction becomes forward biased. The transistor 40 now begins to conduct causing an increase in voltage across transformer 14. This voltage is coupled by transformer 14 into the base of the transistor causing the conduction to increase. This regenerative process continues until the transistor becomes saturated. At this time, the collector current flowing through the transformer begins to increase exponentially. Since the voltage across the collector winding is fixed, the base current is fixed. Thus, after a period determined by the transformer inductance and the transistor characteristics, the base current is no longer sufficient to maintain the transistor in saturation and the voltage across the collector winding of the transformer decreases. This decrease causes a corresponding decrease in the base current and the resultant regeneration action causes the transistor to switch off.

During the period of conduction, the base current charges capacitor 41 such that when the base winding voltage is essentially zero, the transistor is reverse biased. Resistor 42 then charges capacitor 41 in the reverse direction until transistor 40 is rendered conductive. This process is normally repetitive with the time between pulses being determined by the product of capacitor 41 and resistor 42. In one embodiment tested and operated at a rate of 100 kilocycles per second, the pulse duration was selected to be 1 microsecond.

While the blocking oscillator is free-running, it will be noted that its collector is coupled to reference potential 18 through transistors 50, 51, 52 of gating circuit 17. These transistors are normally off in the absence of an input signal at terminals 20, 21. Although the blocking oscillator may be individually coupled to the reference potential, the present mode of coupling minimizes the power requirements in that the blocking oscillator is only energized when an input signal is applied to the gating circuit. The blocking oscillator is coupled to the first pulse transformer, which corresponds to numeric 1, since it will be energized by each input signal.

When an input signal is applied to terminals 20, 21 one or more of the transistors 50, 51, 52 are rendered conductive. For example, a binary input of 10 wherein $B_0$ is zero and $B_1$ is one results in transistor 50 conducting since its base is coupled to both input terminals through the "or" circuit comprised of resistors 53, 54. In addition, transistor 51 is rendered conductive since its base is coupled to terminal 21 by resistor 55. The base of transistor 52 is coupled to both input terminals by an "and" circuit comprised of diodes 56, 57 so that it is rendered conductive by the presence of both digits in the input signal.

The gating circuit performs, in effect, two functions, one, it gates the blocking oscillator so that pulses do not appear at terminals 11, 12, 13 until a signal is applied at terminals 20, 21 and two, it determines which of the pulse transformers 14, 15, 16 are energized. As discussed in connection with FIG. 1, an output energizing voltage appears at terminals 34, 35, 36 only when the corresponding SCR is rendered conductive by either the establishment or collapse of the flux in the associated pulse transformer. Therefore, the presence of the energizing voltage at the output terminals is controlled by the binary input signal.

Figure 3:
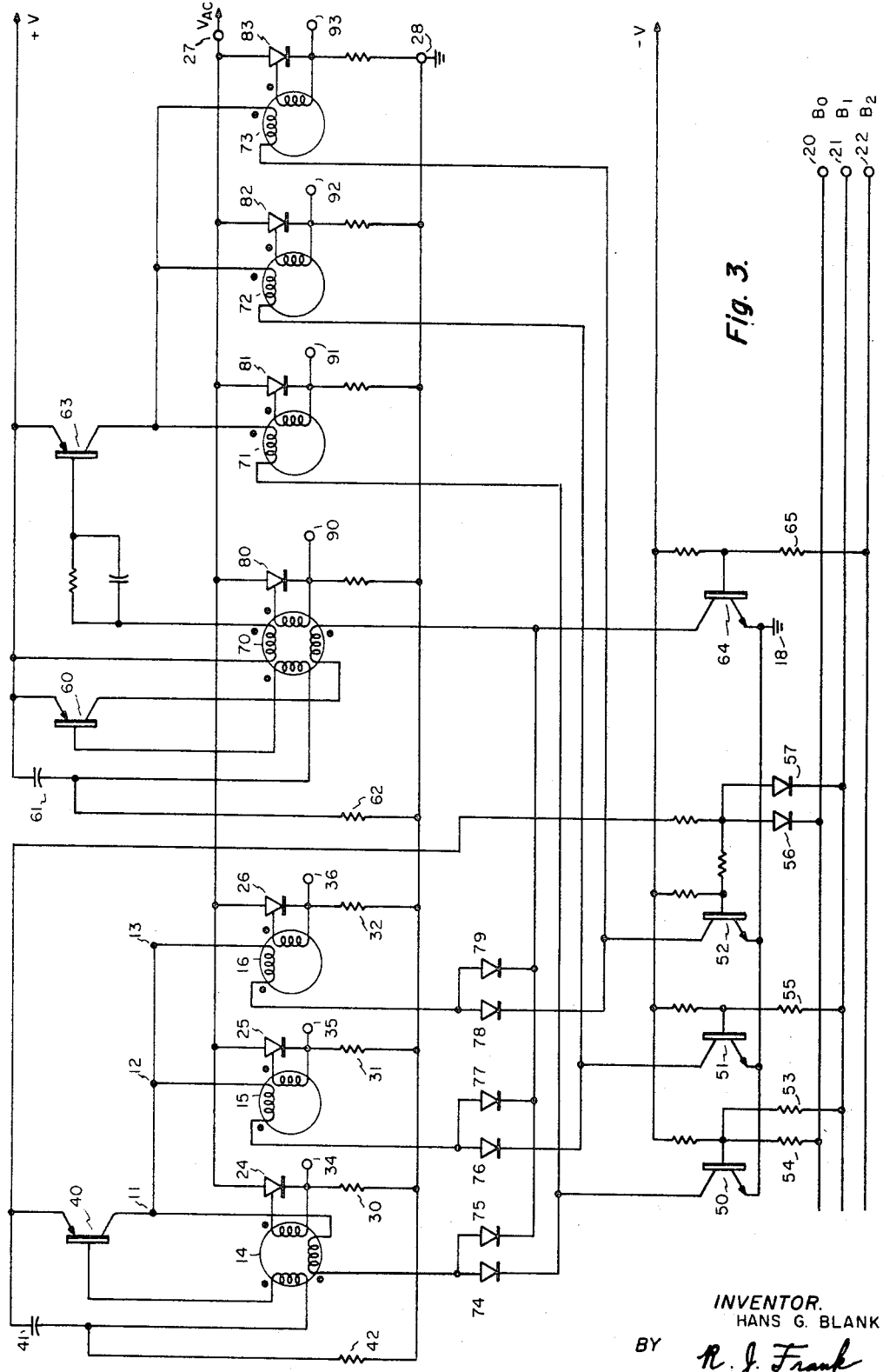
FIG. 3 is an electrical schematic diagram of a second embodiment of the invention.

The number of digits in the binary signal may be increased as desired by employing additional pulse transformers, SCR's and transistor switches in the afore-described manner. However, the pulse transformers are connected in parallel with the result that the pulse width which is determined by the effective inductance of the pulse transformer in the output or collector circuit of the blocking oscillator, decreases as the number of pulse transformers connected in parallel to a single blocking oscillator increases. This effect may be compensated for as shown in FIG. 3 by employing a second blocking oscillator comprising transistor 60, capacitor 61, resistor 62 and transformer 70. This blocking oscillator is gated by transistor 64 which in turn is responsive only to the $B_2$ digit of the input signal.

The presence of the $B_2$ digit, i.e. numeric four, results in the energization of the oscillator and an output energizing voltage at terminal 90. In addition, the collector of transistor 60 is coupled via diodes 75, 77, 79 to pulse transformers 14, 15, 16 so that the transformers are also energized and an output voltage appears at terminals 34, 35, 36. Therefore, the numeric and all lower outputs are obtained for a $B_2$ input.

The highest numeric for the three digit input signal is seven so that three additional pulse transformers 71, 72, 73, three SCR's 81, 82, 83 and three output terminals 91, 92, 93 are provided. These pulse transformers need not be provided with individual gates but may be coupled directly to transistors 50, 51, 52 respectively. It will be noted however that transformers 80 through 83 are not energized except when the $B_2$ digit is present at terminal 22. Further, pulse amplifier 63, shown coupled to transformer 70, is provided to energize transformers 81, 82, 83. This preserves the pulse width as previously discussed with pulse amplifier 63 being triggered into conduction by the output pulse of the blocking oscillator.

Figure 4:
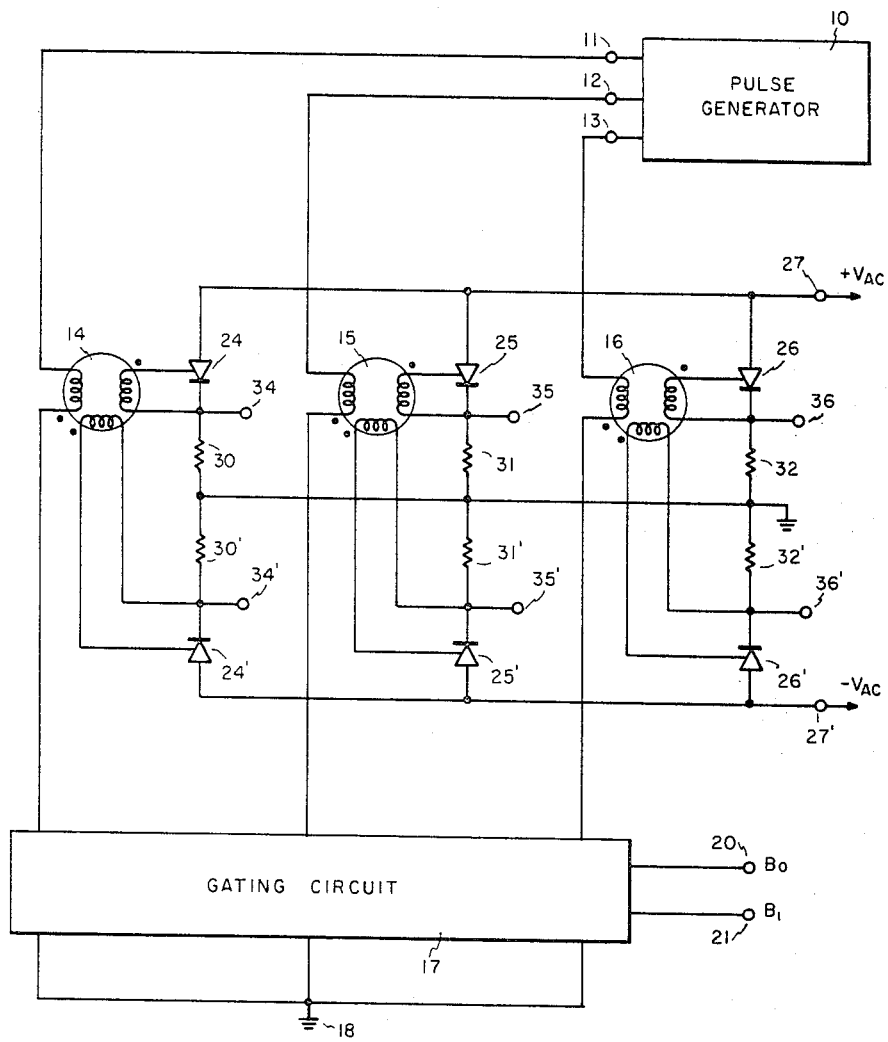
FIG. 4 is a block schematic diagram of a third embodiment of the invention.

Referring now to FIG. 4, a further embodiment of the invention is shown in which an additional secondary winding is added to each pulse transformer 14, 15, 16. This secondary winding is coupled to the second electrode of an additional SCR 24′, 25′, 26′ which, in turn, is connected to a corresponding resistor 30′, 31′, 32′. The operation of this driving circuit is similar to the circuit of FIG. 1 with the exception that a pair of SCR's, for example SCR's 25 and 24′, are rendered conductive by the flux in a single transformer while formerly a single SCR was coupled to each transformer.

By applying an alternating voltage between terminals 27 and 27′ or applying two phases of an A.C. supply which are 180 degrees out of phase to the terminals, the output voltages at each pair of output terminals, such as 34, 34′, are of equal magnitude and 180 degrees out of phase. The bipolar output from this driving circuit is found well suited for driving an electroluminescent bar graph wherein the first and second electrodes are segmented and the concurrence of the out of phase signals is necessary to activate a portion of the lamp.

While the above description has referred to specific embodiments of the invention, it is apparent that many variations and modifications may be made therein without departing from the spirit and scope of the invention.

What is claimed is:
1. A solid state driving circuit for a segmented display device wherein the segment corresponding to the magnitude of a coded signal and all lower segments are concurrently energized which comprises:
 (a) a first plurality of four-layer semiconductor elements having first, second and third electrodes, each of said elements being maintained in a continuously conductive state by the application of a series of pulses to its second electrode;
 (b) a first plurality of impedances, each of said impedances being coupled to the third electrode of one of said semiconductor elements;
 (c) first means for applying a voltage across each combination of semiconductor element and impedance, said voltage appearing substantially across the corre- sponding impedance when said element is conductive;

(d) a first plurality of driving circuit output terminals, each of said terminals being coupled to the junction of the third electrode of one of said elements and the corresponding impedance, a first driving signal appearing at each output terminal during the interval that the corresponding semiconductor element is rendered conductive, said output terminals being coupled to the segments of said display device;

(e) a plurality of transformers, each of said transformers having a primary winding and a secondary winding, each of said secondary windings being coupled between the second and third electrodes of a corresponding semiconductor element whereby the load on a secondary winding is comprised of a diode formed by adjacent layers of the corresponding semiconductor element;

(f) a pulse generator for continuously providing a series of pulses at its output terminals, each output terminal of said pulse generator being coupled to a primary winding of one of said transformers; and (g) a gating circuit coupled between the primary windings of said transformers and a reference potential, said gating circuits being responsive to the coded input signal whereby the pulses from said generator are supplied to selected transformers and maintain the corresponding semiconductor elements continuously conductive.

2. The driving circuit of claim 1 in which the polarity of the secondary windings of the transformers is reversed with respect to the polarity of the primary windings whereby the trailing edge of the pulses from the generator render the semiconductor elements conductive.

3. The driving circuit of claim 1 further comprising:

(a) a second plurality of four-layer semiconductor elements having first, second and third electrodes, each of said elements being maintained in a continuously conductive state by the application of a series of pulses to its second electrode, (b) a second plurality of impedances, each of said impedances being coupled to the third electrode of one of said second plurality of semiconductor elements, (c) second voltage means for applying a voltage across each combination of second semiconductor element and second impedance, said second voltage means being 180 degrees out of phase with said first voltage means, (d) a second plurality of driving circuit output terminals, each of said terminals being coupled to the junction of the third electrode of one of said second elements and the corresponding second impedance, a second driving signal appearing at each output terminal during the interval that the corresponding semiconductor element is rendered conductive, said second plurality of output terminals being coupled to the segments of the display device whereby bipolar driving signals are applied to the display device, and (e) each of said pluralities of transformers includes a primary winding and two secondary windings, said secondary windings having their polarity reversed with respect to the primary winding, one of said secondary windings being coupled between the second and third electrodes of a first plurality semiconductor element and the other secondary winding being coupled between the second and third electrodes of a second plurality semiconductor element whereby pulses from said generator supplied to the primary windings of selected transformers maintain both first and second plurality elements continuously conductive.

4. Apparatus in accordance with claim 3 in which said gate means comprises:

(a) a plurality of transistor switches having first, second and third electrodes, said first and third electrodes being coupled in series with said pulse generator output terminals and said pulse transformers;

(b) a plurality of input terminals, each of said input terminals having a particular digit of said coded input signal applied thereto; and (c) logic means coupled to said input terminals and to the second electrodes of said switches.

5. Apparatus in accordance with claim 4 further comprising:

(a) a bar graph display device having a number of display levels, said device having a plurality of input terminals, each of said input terminals corresponding to one of said display levels, and (b) means for coupling each of said display device input terminals to a driving circuit output terminal, the driving signal at said output terminals energizing said display device in accordance with said coded input signal.

References Cited

UNITED STATES PATENTS

| | | | |
|---|---|---|---|
| 2,881,320 | 4/1959 | Goldberg | 340—324 |
| 2,987,627 | 6/1961 | Eckert | 307—253 |
| 3,102,259 | 8/1963 | Totz | 340—347 |
| 3,316,427 | 4/1967 | Muskovac | 307—252 |
| 3,328,790 | 6/1967 | Rhodes | 340—324 |
| 3,343,155 | 9/1967 | Pahlavan | 340—324 |

JOHN W. CALDWELL, *Primary Examiner.*

A. J. KASPER, *Assistant Examiner.*